United States Patent [19]
Strojny et al.

[11] 3,832,688
[45] Aug. 27, 1974

[54] STATUS SENSING AND TRANSMITTING CIRCUIT

[75] Inventors: Lawrence J. Strojny, West Allis; Paul H. Froehling, Franklin, both of Wis.

[73] Assignee: Johnson Service Company, Milwaukee, Wis.

[22] Filed: Dec. 15, 1972

[21] Appl. No.: 315,573

[52] U.S. Cl. .......... 340/147 R, 340/163
[51] Int. Cl. .......... H04q 5/00
[58] Field of Search .......... 340/147 R, 163

[56] References Cited

UNITED STATES PATENTS

| | | | |
|---|---|---|---|
| 3,518,628 | 6/1970 | Giel | 340/163 X |
| 3,522,588 | 8/1970 | Clarke | 340/163 X |
| 3,652,993 | 3/1972 | Bridwell | 340/163 X |
| 3,728,681 | 4/1973 | Fuller | 340/163 X |

*Primary Examiner*—Harold L. Pitts
*Attorney, Agent, or Firm*—Andrus, Sceales, Starke & Sawall

[57] ABSTRACT

A contact status sensing circuit monitors a plurality contact means and generates a signal in response to a status change. The circuit forms a point module in the remote station of a communication loop system having a central controller to generate message frames having address and command binary coded bits. The module includes an address encoding means to fill a frame and an address decoding means to generate an enable signal to respond to a properly addressed frame. A contact storage register had related inputs-outputs for each contact and a comparator logic gate compares such inputs-outputs to generate a signal. The individual comparator gate outputs are combined and actuate a flip-flop circuit and pulse circuit to complete the setting of the flip-flop circuit. The module obtaining a message frame, inserts its address and the contact status. The controller acknowledges receipt of such information and generates a clear frame which updates the register, clears the interrupt and again places the latest contact status on the output bus lines. The monitored contacts are isolated by connection to a reed relay coil connected to an isolated power supply. The reed relay contacts are connected in a logic network connected to the input of the register and to the bus lines.

16 Claims, 2 Drawing Figures

STATUS SENSING AND TRANSMITTING CIRCUIT

BACKGROUND OF THE INVENTION

The present invention relates to a status sensing apparatus for monitoring of remotely located means and particularly contact or switch load means from a control station and for transmitting information regarding the status thereof.

In automation control and information systems, various switching contact means or the like are employed in the connecting of the hardware of other load means into an operating system. The contact means can advantageously be remotely controlled. For example, in environmental control systems for buildings and building complexes, a central controller may be employed to operate various heating, ventilating and air-conditioning supply equipment which is distributed through the building or building complexes. A particularly satisfactory computerized control system is disclosed in the copending application of Buchanan et al entitled *DATA COMMUNICATION SYSTEM EMPLOYING A SERIES LOOP*, Ser. No. 315,567, which was filed on Dec. 15, 1972 the same day as this application and which is assigned to the same assignee. As more fully disclosed therein, a plurality of remote stations each includes controlled or controlling load means, some of which may include contact means. The remote stations are connected to a central loop controller by a serial communication loop cable with communication established by continuous generation of time spaced, multiple bit message frames which are selectively generated and transmitted by the controller. The remote stations selectively receive the message frames, which may generally be "Dedicated" frames directed to a particular station or an "Available" frame which can be filled by a remote station for communication to the loop. The remote stations process the bit information and, if directed to do so, may provide for the automatic setting of the contact means in a desired position and/or reading the status of the contact means.

Although communication systems have been employed to remotely operate contacts and maintain monitoring of said contacts, special communication lines generally have been provided and once a status change is indicated the system normally requires scanning to determine the location of the contacts. The systems not only require the complexity and expense of additional trunk lines but also require significant response time to separately detect a status change and then by scanning more particularly locate such change.

SUMMARY OF THE PRESENT INVENTION

The present invention is particularly directed to a status sensing circuitry which maintains a continuous monitoring of a load means such as the contact means and a simultaneous indication and identification of the location of a status change. The present invention also permits complete isolation between the load circuit means and the sensing circuitry. Generally, in accordance with the present invention, the contact sensing means is adapted to be connected in a loop system to a loop controller, such as disclosed in the above identified application. The sensing means is provided with a particular addressing means and interconnecting logic means for connecting of the output to the loop system. The contact status is stored in a suitable storage means such as a register means. A comparator means is connected to the contacts and to the storage means. Any change in status results in generation of a signal for a message frame. The change in the contact status in introduced into a properly directed message frame for transmission to the loop controller, along with the address of the contact. The loop controller acknowledges receipt of the information, clears the request, and updates the storage means to maintain a continuous status record.

Generally, in accordance with the present invention, the point module includes a coded address coupled to the frame handling means through a common bus cable. The addressing means provides an enable output signal for activating the point module signal when a frame with its address is applied or transmitted to the point module. The enable signal activates the point module circuitry to transmit the data regarding the contacts. The point module may includes multiple point storage means and a plurality of comparison networks to simultaneously monitor a plurality of contact points and within the capability of the message frame of the loop system. Thus in the previously identified application a final data byte of the message frame included eight logic bit locations. This would permit the simultaneous monitoring of eight contact inputs, one for each bit.

In such a preferred construction, the storage register is connected to the individual contact sensing networks in common with the connection to the contact status output bus lines of the point module. The related inputs-outputs of the register are combined in a comparator logic gate to compare the contact status on the output bus lines and register output. Any change in contact status results in actuation of the corresponding logic circuits to generate a corresponding indicative signal. The output of the several individual comparator gates are combined through a logic network such as an eight input OR gate with an output connected to an interrupt register.

The output of the OR gate provides input to an interrupt request logic means which provides a delay allowing the changing contact input to stabilze. Then, a request is made to a priority logic circuit which, in turn, utilizes its priority input and interrupt enable and strobe signals to place the request in the frame handling logic via the bus.

Upon receipt of an available message frame, the point module fills the frame and the information is transmitted through the loop system to the controller. The controller acknowledges receipt of such information by generating a clearing frame with the point module address which is applied through a common bus line to update the register with the latest contact status information as it clears the interrupt and also directs the point module to again place the latest contact status on the output bus lines.

The field or load contacts in an optimum construction are interfaced to the contact status network through an isolating network such as suitable reed relays. Thus, the main field or load controlling contacts are connected to a conventional fifteen volt isolated power supply in series with a reed relay coil. Closure of the field contacts results in a corresponding closing of the reed relay contacts which are connected in a logic circuit to produce a logic 0, indicating the field contact status. The logic signal is compared with the contents of the register storing the earlier contact status to provide a sequencing as described.

The present invention provides a means of continuously monitoring the contact status with the communication over the common transmission cable and without the necessity for any additional trunk wiring. The contact status and its location is simulatneously established and transmitted to the loop controller. Any one of a plurality of contacts can be interfaced through the single point module with the condition of the several contacts simultaneously transmitted to the loop controller.

The present invention has been found to provide a reliable and continuous monitoring and reporting of the status of contact means.

BRIEF DESCRIPTION OF THE DRAWING

The drawing furnished herewith illustrates a preferred construction of the present invention in which the above advantages and features are clearly disclosed as well as others which will be readily understood from the subsequent description of such illustrated embodiment.

DESCRIPTION OF THE ILLUSTRATED EMBODIMENT

Figures 1, 2:
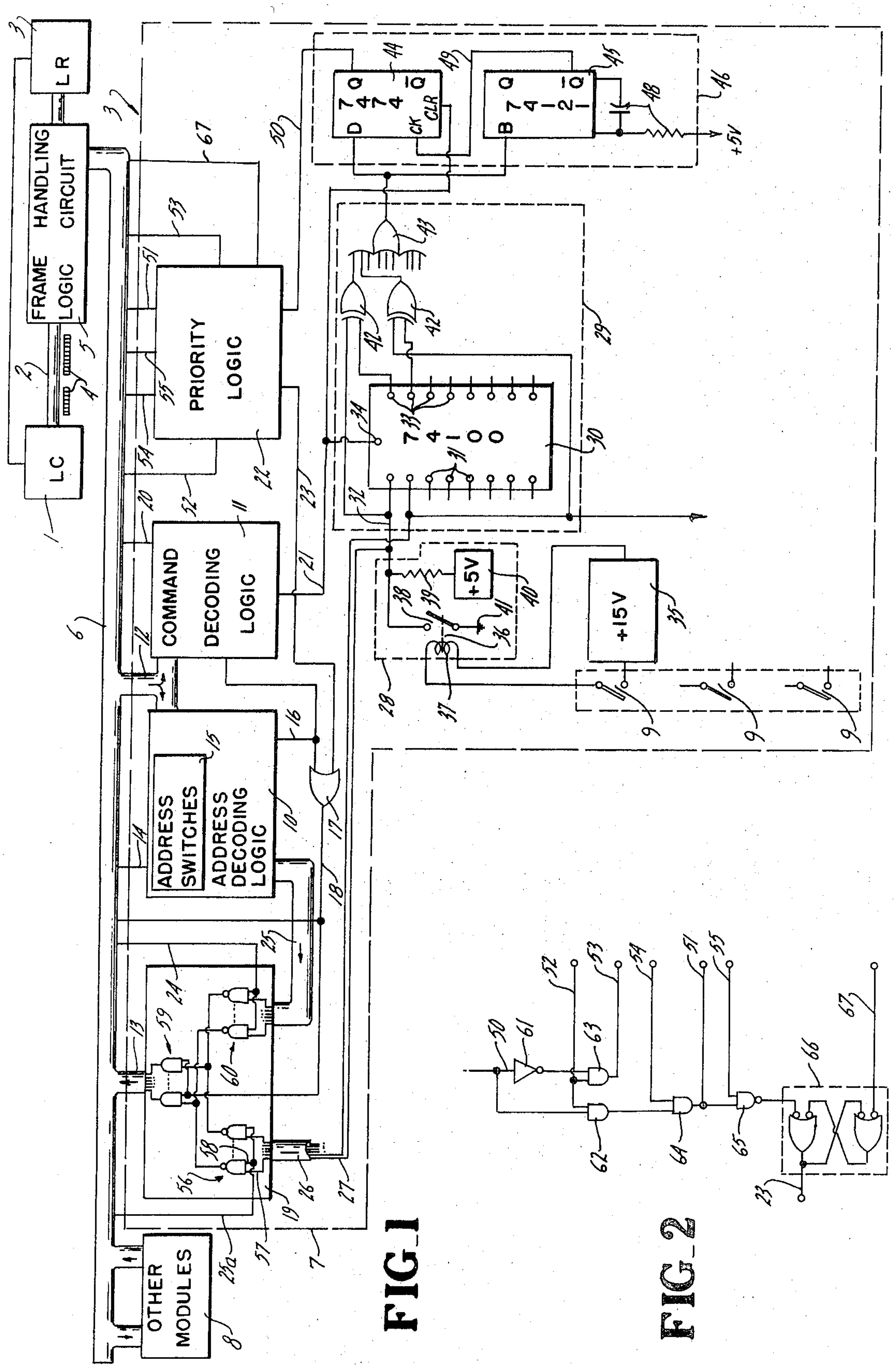
FIG. 1 is a diagrammatic illustration of a point module of a contact sensing and status change network interconnected into a loop communication system.
FIG. 2 is schematic of the priority basic unit shown in FIG. 1.

Referring to the drawing, the present invention is shown in connection with a data communication loop system employing a central loop controller 1 serially coupled by a loop communication cable 2 to a plurality of similarly constructed remote stations 3, generally as more fully disclosed in the previously referred to Buchanan et al. application. Thus, the central controller 1 generates message frames 4, each of which includes a plurality of digital logic bits. The frames 4 are circulated in serial fashion throughout the loop to establish communication with the remote stations 3 in a selected manner. Each of the remote stations 3 generally includes a message frame handling means 5 which interfaces a common bus cable 6 to the loop cable 2 for receiving and retransmitting the message frames. The frame handling means 5 selectively transmits information of the message frames 4 to the several point modules 7 and 8.

The illustrated contact sensing point module 7 is illustrated as having means for simultaneously and separately monitoring the status of up to eight sets of contacts 9, of which only one is shown connected in the module network. All contact are similarly connected for selectively communicating any change of status in any of the contacts 9 to the loop controller through the common cable bus 6 connecting the several point modules 7 and 8 to the frame handling logic circuit 5.

Each of the point modules 8, in turn, include similar logic means for receiving the information from the message frame 4 and processing the information to provide for the selected operation of operating hardware or other load means such as set point adjustment, checking the status of the hardware and/or receiving information from the hardware. For example, the system may be adapted to read an analog output of a temperature sensor. Alternatively, the point modules 8 may control the start-stop motor control with sensing of the status of the motor operation.

The message frames 4 are divided into a plurality of bit subgroups or bytes which may include four bytes to provide for selective addressing of the remote station, addressing of the point module, introducing a command for controlling execution of a function, and the selection of a particular load means, as more fully disclosed in the Buchanan et al. application. Thus, in that application, each message frame 4 includes 36 bits, divided into four bytes of nine bits each. The first byte includes three frame status logic bits, five remote station address bits, and a final parity bit. The second byte includes a pair of acknowledgment bits, six point module address bits and a parity bit. The third byte includes an initial four command bits followed by status checking and a parity bit, while the fourth byte includes eight data bits and a final parity bit. Although any suitable format can be employed, the present invention is particularly described in connection with the above format.

The present invention is particularly directed to the status sensing system shown in detail for module 7.

The contact point module 7 includes an address decoder 10 and an interconnected command decoder 11 for controlling communication through the common bus 6. The block illustrated units 10 and 12 may be of any suitable construction; for example, as more fully disclosed in the copending application of Lawrence J. Strojny entitled "Remote Coded Dual State Controller Apparatus", Ser. No. 315,447 which was filed on December 15, 1972 the same day as this application and which is assigned to the same assignee.

The contact point module 7, like other point modules, receives binary logic information from selected frames 4 and supplies information to other frames 4 via bus 6 which includes an eight conductor path or line unit 12 for data into the point module 7 and numerous control signal lines, as shown and hereinafter described.

The point module 7 particularly includes a bus control signal "address available" line 14 which activates decoder 10 to examine six of the data-in signals in the address decoding logic 10, which is connected to bus 6 by the line unit 12. Upon examination, the six data-in address signals of the second byte of message 4 are logically compared with the settings of six address switches 15 in the unit 10. If identical, an enable signal is generated at an enable line 16 and coupled to command decoder 11 and to an enable return gate 17. An enable signal at line 16 permits subsequent decoding of the command bits of the frame 4 in the command decoder 10 and via gate 17 generates a return enable signal at a return enable line 18 which is connected to enable a data bus logic unit 19 and to the bus 6 to signal the frame handling logic unit 5 and thereby provide positive acknowledgment of the response by the addressed point module 7.

The command decoder 10 is a decoding logic circuit and, having been enabled by the enable signal at line 16, examines the four command bits of message frame 4 which are connected as data-in signals via the line unit 12, upon receiving a command available signal from a bus line 20. The command decoding logic circuit 11 includes an acknowledge signal output line 21. The circuit 11 combines two commands through an OR gate, not shown, to produce an acknowledge signal at line 21 as the only output of this logic section for the contact sensing point module 7. Other types of point modules, such as discussed or referred to in the Buchanan and Strojny applications, may utilize other command codes and provide numerous outputs.

The point module 7 supplies information regarding the status of contacts 9 to the frame handling logic unit 5 via the bus 6 by means of its data-out path or line unit 13, which is the output of the data bus logic circuit or unit 19. The data bus logic 19 is selectively enabled by the enable return signal on line 18 which results from either recognition of its address which produces an enable signal at line 16 in the processing of a frame containing such an address or a request granted signal developed and received from a priority unit 22 via a line 23 in the processing of an available frame 4. In the processing of an available frame 4 in which the request granted signal at line 23 is present, the address of the point module 7, as determined by the settings of the six address switches 15, is placed onto the bus 6 via the data-out line unit 13 by means of an address strobe signal 24 and an address signal line cable 25 from the address switches 15 of the decoder 10. In both the addressed and the available frames, in which the enable return signal is present, the contact status information set in a status line cable 26 is placed on the bus 6 via the data-out line unit unit by means of an appropriate signal from unit 5 to a data strobe signal line 25*a*.

The status line cable 26 includes individual contact related lines 27 connected to a corresponding contact status sensing network 28 in common with one input of a status monitoring circuit 29. All of the other contacts 9 are similarly connected into the circuit.

The monitoring circuit 29 includes a storage register 30 having eight separate input terminals 31, one for each of the contacts 9. Each input 30 is connected to a contact status sensing network 28 via a signal line 32 which is also connected to a line 27 of output data cable 26 for transmission of the contact status information to bus 6 via unit 19 and thereby to a message frame bit as a binary logic signal. Each of the inputs of the registor 30 includes a corresponding related output terminal 33. The input is stored in the register 30 and transferred to the output terminal 33 only in response to the receipt of a transfer signal at the clock input terminal 34 of the register. Thus at any given instance, a current contact status signal exists at the input line 32 and simultaneously on the data bus coupler or cable 27. The previous contact status appears on the output line terminal 33. Consequently, if there is a change in the contact status the logic level signal on the contact status lines will differ.

The field contacts 9 which are being sensed or monitored are interfaced through the sensing network 28 which forms an electrical isolating means. In the illustrated embodiment, each of the field contacts 9 are connected to an isolated power supply 35 to permit proper operation of the associated equipment. A reed relay 36 of unit 28 has its winding or coil 37 connected in series with the contacts 9 to the isolated power supply. The contacts 38 of the reed relay are normally open contacts which are closed upon closing of the field contacts 9.

A logic sensing resistor 39 is connected in series with the reed relay contacts 38 to a logic level voltage supply 40 and in particular with the contacts 38 connected between the logic ground 41 and the resistor 39. When the contacts 38 close, the corresponding end of the resistor 39 changes from a relatively high voltage to a logic ground. This corresponds to the conventional change from a logic 1 to a logic 0.

The junction of the resistor 39 and the reed relay contacts 38 is connected to the input line 32 for corresponding application of the logic level signal to the register input 31 and to the data bus line coupler 27.

The input and output terminals 31 and 33 of the register 30 are coupled to an exclusive OR gate 42 as a comparator gate means which will produce an output logic signal whenever the terminals are at different logic levels. A separate gate 42 is provided for each set of register input-output lines 31 – 33 and the output of these several gates are connected as individual inputs to a combining eight input OR gate 43. Consequently, the system continuously and simultaneously monitors the status condition of up to eight contacts in the illustrated embodiment of the invention and a change in status of any one of them results in the generation of an output or frame request signal from the combining logic gate 43.

This signal is connected to the input of a flip-flop coupling circuit 44 and to a pulse generating circuit 45 of an interrupt request logic unit 46. The illustrated pulse generating circuit 45 is an integrated circuit connected through a resistive-capacitive network 48 and will produce a timed delayed output signal in response to the signal from logic gate 43. The timed output is connected to the clock input line 49 of the coupling circuit 44 to set the positive output line 50 for logic 1. Line 50 is connected to actuate the priority logic unit 22 for obtaining of an available frame 4.

The interrupt request signal at the output of the OR gate 43 is thus delayed and latched-in by the interrupt request logic circuit 46. The delay in providing a request input to the priority logic circuitry 22 allows the transition of a changing input or inputs to stabilize. Upon requesting an available frame 4 through the priority logic unit 22, several conditions must be met before its request may be placed on the bus 6 and particularly on a "request output" signal line 51.

First, the contact point module 7 is connected in a logic priority chain through bus 6 with all other point modules 8 having interrupt capabilities by means of a priority signal at a priority input line 52 and a signal at a priority output line 53. If no other point module 8 with higher priority by means of its relative position on the bus 6 has a request input pending, the point module 7 under consideration will use its request input signal to remove its signal from priority output line 53, thereby preventing all point modules with lower priority from using a request input to generate a request output onto the bus 6.

The frame handling logic unit 5 generates an interrupt strobe signal at line 54 and an interrupt enable signal at line 55 during the processing of an available frame 40. The lines 54 and 55 are connected to the priority logic circuitry 22 and conjointly allow a request output signal to be generated and also sets as logic true the "request granted" signal at line 23.

Having set the request granted signal at line 23, further processing of the available frame occurs as described previously. Thus, gate 17 activates the enable return line 18 which is coupled to the bus 6 and also enables the data output unit 19.

Thus, the logic unit 19 includes a first set of status logic gates 56, one for each status line 27. Gates 56 are two input gates having a first input 57 connected to the one particular status line 27 and the other input 58 connected to the data strobe line 25a with all other gates 56. The output of each logic gate 56 is connected to a separate coupling gate 59, the output of which is connected to data output cable or line unit 13. The gates 59 have a second input connected to the enable line 18. When the gates 59 are thus enabled, a strobe signal at line 25 transfers the status information to the bus 6 and thus to an appropriate frame 4.

The same logic unit 19 as previously noted has also introduced the module address into the same frame. Thus, a series of two input logic gates 60 have a first input connected via cable 25 to the circuit of the address switches 15. The second input of each gate 60 is connected in common to the address strobe signal line 24. The output of gates 60 is connected to the gates 59 in common with the output of gates 56, with the strobe signal lines 24 and 25 providing for selective transfer of the information.

The loop controller 1, upon receipt of such particular message frame 4, will recognize the action taken on such frame and in particular will recognize the conversion of an "Available" frame to one filled by a point module 7. The controller 1 further recognizes the particular point module address and receives and processes the information, updating the status of all of the contacts 9. The loop controller 1 will further, upon recognition of such message frame 4 generate a subsequent message "Dedicated" frame which is addressed to the corresponding point module 7 and includes a command signal. This command signal is applied via the common bus 6, after proper processing of the message frame 4, to the interrupt-acknowledge line 21 and thereby to register 30. This causes the register 30 to be updated to the latest contact status information; that is, all of the output lines 33 are converted to the condition of the input lines 36. This acknowledge signal further clears the interrupt signal from gate 43. The latest contact status appears on the output bus cable 27 and the inputs to the register 30. The "Dedicated" frame 4 and the enable line 16 cause the unit 19 to again insert the contact status on cable 27 in the acknowledge frame which is, of course, returned to the loop controller 1, which recognizes the frame as such.

The priority logic unit 22 may be of any suitable construction, and a particularly satisfactory logic gate assembly is shown in FIG. 2, with the input-output lines of FIG. 1 correspondingly numbered. Thus, the request input line 50 is connected to the input of an inverter gate 61 and as one input to a two-input AND gate 62. The output of the gate 61 is anded with the signal of the priority input line 52 by an AND gate 63, the output of which is the priority output line 53, to disable other lower priority modules. The signal on priority input line 52 is also anded with the input signal at line 50 by gate 62 and applied to a further AND gate 64 which has a second input connected to line 54. Thus, if an interrupt request is pending and the priority permits, the interrupt strobe signal generates a request output on the output side of gate 64 which is connected to the line 50.

The request output is processed by the frame handling means 5 to provide an Available frame 4 to point module 7 with an interrupt enable signal applied via line 55. This signal is combined with the pending request signal by a two-input NAND gate 64, which has as its inputs the line 55 and the output of gate 64. The gate 65 generates an appropriate signal which is connected to set a flip-flop circuit 66 and thereby generate a requestgranted signal at line 23, which is connected via gate 17 to provide for transfer of the status and address information as previously set forth.

The flip-flop circuit 66 constitutes a latch to maintain a request pending which is cleared by the final Acknowledge frame 4 through a general reset line 67 connected to the reset input of the latch circuit 66. Thus, this system provides for the continuous simultaneous monitoring of the status of the contacts and immediately provides for communication indicating the change in status and simultaneously indicating the location of the change. The point module specifies and identifies the remote location, whereas the particular data bit will further pin-point the particular load means which have changed.

Various modes of carrying out the invention are contemplated as being within the scope of the following claims, particularly pointing out and distinctly claiming the subject matter which is regarded as the invention.

We claim:

1. A status sensing apparatus for monitoring and indicating the status and location of a load means, and for transmission with a communication network producing message frames comprising a load signal means for producing a load signal, load address means for identifying said load signal, a storage means having an input means connected to the load signal means and having an output means, a comparator means coupled to the input means and the output means of the storage means and operable to generate an interrupt signal in response to a selected difference of the input means and the output means, and transfer means coupled to said comparator means and operable to enable said load address means and said load signal means to transmit to the communication network to request a message frame and to introduce said load signal to a message frame.

2. The status sensing apparatus of claim 1 wherein said storage means includes clock means for resetting the output means to correspond to the input means, said transfer means including storage means connected to said comparator means to establish a latched request signal for communication with said network and having a reset means, and coded connection means connected to said clock means and to the reset means and responsive to a coded command message frame.

3. The status sensing apparatus of claim 1 for monitoring and indicating the status of a plurality of contact means, the status of each contact means being recorded in adjacent single bit binary signals in a multiple bit message frame, said storage means having an input means and a corresponding output means for each contact means, said comparator means including a plurality of comparator elements coupled to the corresponding input means and output means for each of the contact means, a combining logic means connected to each of said comparator elements and to said transfer means, said transfer means including means to obtain a message frame of the network and operable to insert the address means and the status of said plurality of contact means in said message frame.

4. The status sensing apparatus of claim 3 wherein said transfer means includes a gated flip-flop unit connected to the combining logic means and having a clock input, a pulse circuit connected to said combining logic means and operable to generate a delayed pulse, said pulse circuit being connected to said clock input to delay setting of said flip-flop unit.

5. The status sensing apparatus of claim 1 having a loop communication connecting means including a binary coded coupling circuit responsive to a multiple message frame, and having address decoding and encoding means, and said transfer means including first means operable to insert the address and the load signal into a message frame, and reset means connected to respond to a subsequently received coded message frame to update the storage means and resetting the comparator means to remove the interrupt signal.

6. The status sensing apparatus of claim 5 wherein said reset means further introduces the status into the coded message frame.

7. In combination, a contact status sensing load module for a data loop communication system having a plurality of remote stations including at least one load module and a loop controller generating and transmitting to said stations in timed relation a plurality of multiple bit message frames each including a module address byte and a data byte and a command byte, each of said remote stations including a frame logic circuit for receiving each of said message frames and selectively transmitting a frame via a common module bus to the load modules, at least one of said load modules being a status sensing load module having monitored contacts comprising a module address decoding means, a module address encoding means,

- a contact isolating network coupled to said monitored contacts and establishing a related electrically isolated logic signal identifying the contact status,
- a storage register having an input means connected to the isolating network to receive said logic signal and having an internal storage means for each input means to receive said signal in response to a clock command signal at a clock input, said register having an output means for each of said input means,
- a logic comparator having a first input connected to the input means and a second input connected to the output means of the register to generate a frame request interrupt signal in response to the relative condition of the logic signals to said comparator, and
- data logic means connecting said isolating network to said bus and having an enable input connected to said decoding means for selective transfer of the contact status to the network.

8. The combination of claim 7 wherein the load module includes a set-reset circuit including priority logic means and being connected to the comparator and set in response to an interrupt request signal, priority input signal and an interrupt strobe and enable signal and having an output connected to said bus to transmit the signal to the frame logic circuit.

9. The combination of claim 8 wherein the set-reset circuit includes a flip-flop register circuit having a set input connected to said comparator and a clock input and having a frame request line connected to said priority logic means, and

- a pulse circuit having an input connected to said comparator to generate a delayed pulse signal and being connected to said clock input.

10. The combination of claim 7 wherein the isolating network of the status sensing load module includes a sensing coil connected in series with a contact connecting means for connection to the monitored contacts and having a set of isolated sensing contacts coupled to said coil,

- a logic power supply means having a common logic ground,
- a resistor connected in series with the power supply means and said sensing contacts, with the sensing contacts connected between the resistor and the common logic ground to define a sensing point connected to the input means of the storage register.

11. The combination of claim 7 wherein the comparator of the load module includes a plurality of dual input logic gate means having a first input connected to each register input means and a second input connected to each related output means of the register to generate said frame request interrupt signal,

- a combining gate means having individual inputs connected to each of the comparator logic gate means and establishing said interrupt input signal in response to a signal from any of said logic gate means,
- a flip-flop circuit having a set input connected to said combining gate means and a clock input and having a frame request line connected to said common bus, and
- a pulse circuit having an input connected to the combining gate means having an output connected to said clock input, said pulse circuit establishing a delayed pulse to enable said flip-flop circuit a predetermined time after establishment of an interrupt request signal.

12. The combination of claim 11 wherein the interrupt signal is connected to the loop system to select a circulating loop message frame and said data logic means is operable to insert the address of the module and the status of the contact means in each selected frame, said module responding to a dedicated message frame including its address and a command signal to reset said flip-flop circuit, up-date said storage register and again insert the contact status into said dedicated message frame.

13. The combination of claim 7 wherein said data logic means includes a common output means connected to said bus and a first input means connecting said contact isolating network to said common output means and a second input means connecting the address encoding means to said common output means, and strobe signal means for selectively activating said first and second input means.

14. The combination of claim 13 wherein said common output means includes an enable input, and means responsive to a frame command signal and responsive to an interrupt signal to transmit the contact status to the loop controller.

15. The combination of claim 7 wherein selected modules at a remote station having priority patterns for receiving available frames and each of the selected modules includes a priority logic circuit connected to each other and operable to disable all lower priority modules in response to creation of an interrupt request signal generated within the point module, said priority logic circuit including first logic means combining the request signal with priority signals of other modules to establish a pair of output signals including a priority output signal and a transfer signal, transferring logic means processing the transfer signal to generate the interrupt signal and an interrupt request-granted signal, and means connecting the granted signal to said data logic means.

16. A contact status sensing module for a data loop communication system having a loop controller generating in timed relation a plurality of multiple bit message frames for receiving binary information relating to a plurality of monitored contact means, comprising a contact sensing network including a sensing coil connected in series with a contact connecting means for connection to the monitored contact means and having a set of sensing contacts coupled to said coil, a logic power supply means having a common logic ground, and a resistor connected in series with the power supply means and said sensing contacts with connection of the contacts and resistor constituting a binary logic signal point for connection to said loop communication system.

* * * * *